United States Patent
Villman et al.

(10) Patent No.: US 10,465,410 B2
(45) Date of Patent: Nov. 5, 2019

(54) POLE FOR THE TRANSMISSION OF ELECTRIC POWER AND/OR TELECOMMUNICATION SIGNALS, AND USE AND METHOD

(71) Applicant: SMART INNOVATION SWEDEN AB, Stockholm (SE)

(72) Inventors: Günter Villman, Lindingö (SE); Göte Lindfors, Stockholm (SE); Sten Bergman, Stockholm (SE)

(73) Assignee: SMART INOVATION SWEDEN AB, Stockholm (SE)

(*) Notice: Subject to any disclaimer, the term of this patent is extended or adjusted under 35 U.S.C. 154(b) by 142 days.

(21) Appl. No.: 15/024,137

(22) PCT Filed: Sep. 23, 2014

(86) PCT No.: PCT/SE2014/051086
§ 371 (c)(1),
(2) Date: Mar. 23, 2016

(87) PCT Pub. No.: WO2015/047165
PCT Pub. Date: Apr. 2, 2015

(65) Prior Publication Data
US 2016/0215518 A1  Jul. 28, 2016

(30) Foreign Application Priority Data

Sep. 27, 2013 (SE) ........................... 1300618

(51) Int. Cl.
*E04H 12/12* (2006.01)
*H01Q 1/12* (2006.01)
*H02J 4/00* (2006.01)

(52) U.S. Cl.
CPC ........... *E04H 12/12* (2013.01); *H01Q 1/1242* (2013.01); *H02J 4/00* (2013.01)

(58) Field of Classification Search
CPC .......... E04H 12/12; H02J 4/00; H01Q 1/1242
See application file for complete search history.

(56) References Cited

U.S. PATENT DOCUMENTS

2005/0183381 A1   8/2005  Rosenberg
2010/0327488 A1*  12/2010  Ay ..................... B28B 13/027
                                            264/312
(Continued)

FOREIGN PATENT DOCUMENTS

CN       102192486 A      9/2011
DE   10 2011 107804 A1    1/2013
(Continued)

OTHER PUBLICATIONS

International Search Report from corresponding International Patent Application No. PCT/SE2014/051086, dated Dec. 22, 2014.

(Continued)

*Primary Examiner* — Jung Kim
(74) *Attorney, Agent, or Firm* — Tucker Ellis LLP

(57) ABSTRACT

The invention relates to a pole (1) for the transmission of electric power and/or telecommunication signals. The material of the pole includes reinforced concrete with a reinforcement of non-magnetic material. The pole has a length in the range of 2 to 25 m and a maximum cross section dimension less than 0.5 m. According to the invention the pole (1) is hollow along at least a part of its length extension with a cavity (20) surrounded by a layer (9) of reinforced concrete. The pole (1) includes electric power transmission components (14-17) and/or telecommunication components (11-13) arranged in the cavity (20). The electric power transmission components (14-17) include at least one of the components: transformer, energy storage, control equipment and inverter/converter. The telecommunication components (11-13) include at least one of the components: ICT-equip- (Continued)

ment, transmitter, receiver and antenna. The invention also relates to the use of such poles and to a method related thereto.

15 Claims, 2 Drawing Sheets

(56) References Cited

U.S. PATENT DOCUMENTS

| | | | |
|---|---|---|---|
| 2012/0248281 A1 | 10/2012 | Bennett | |
| 2013/0239503 A1* | 9/2013 | Miller | C04B 20/0068 52/414 |
| 2015/0135846 A1* | 5/2015 | Pagani | G01M 5/00 73/777 |
| 2015/0280523 A1* | 10/2015 | Tremelling | H02K 9/19 310/59 |

FOREIGN PATENT DOCUMENTS

| | | | | |
|---|---|---|---|---|
| DE | 10 2012 203816 A1 | 9/2013 | | |
| FR | 2785932 A1 | 5/2000 | | |
| RU | 2481946 | * | 5/2013 | ............ B28B 23/04 |
| WO | 03/021060 A1 | 3/2003 | | |
| WO | 2009/099360 A1 | 8/2009 | | |
| WO | 2010/048688 A1 | 5/2010 | | |
| WO | 2010098716 A1 | 9/2010 | | |

OTHER PUBLICATIONS

Communication Pursuant to Article 94(3) EPC from corresponding European Patent Application No. 14 848 847.1, dated Jan. 3, 2018.

\* cited by examiner

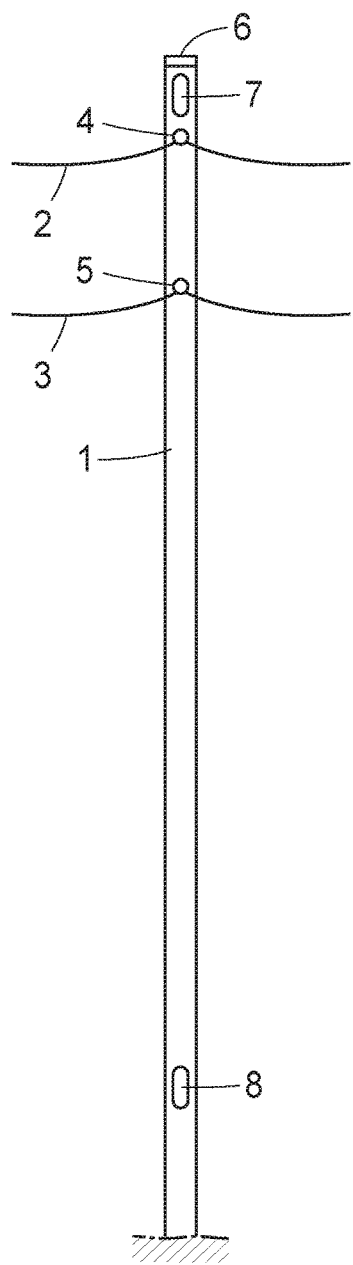
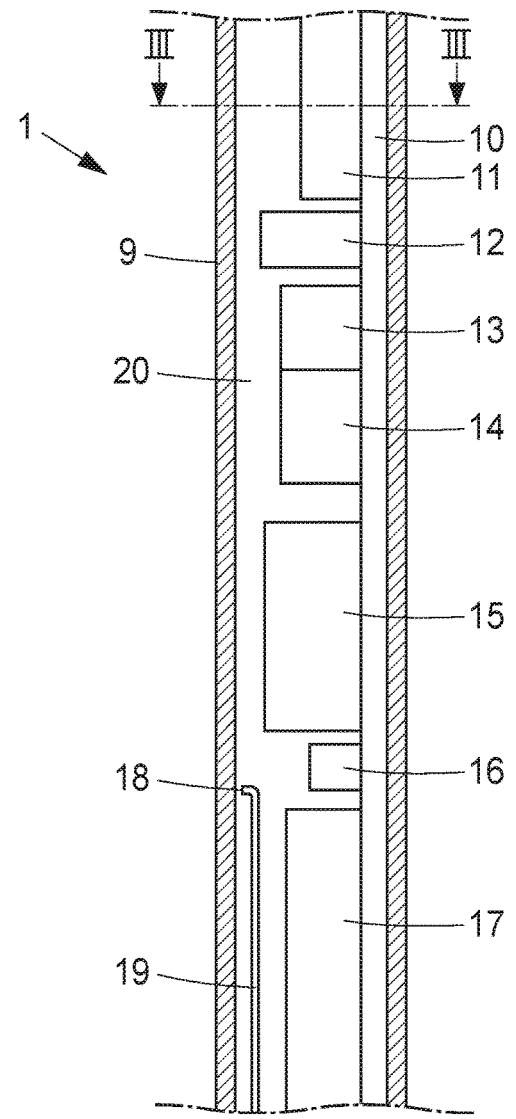
Fig.1
Fig.2

POLE FOR THE TRANSMISSION OF ELECTRIC POWER AND/OR TELECOMMUNICATION SIGNALS, AND USE AND METHOD

FIELD OF INVENTION

The present invention relates in a first aspect to a hollow pole for the transmission of electric power and/or telecommunication signals, whereby the material of the pole includes reinforced concrete with a reinforcement of non-magnetic material.

In the present invention, by pole is meant an element of large length in relation to its cross section dimensions, preferably a length in the order of 2 to 25 meters and a largest cross sectional dimension of 0.5 m.

The pole is intended to be used as a line pole for the transmission of electric power at low, medium and high voltage. Further, it is intended for telecommunication through wire as well as wire-less transmission of the signals. The telecommunication signals may be analogue or digital and relate transmission of speech, music, data, pictures, videos etc. One and the same pole may be used for the simultaneous transmission of electric power and telecommunication signals.

In a second aspect the invention relates to a use of such poles.

In a third aspect the invention relates to a method for the mounting of components for networks for the transmission of electric power and/or telecommunication signals, which network includes poles of concrete reinforced with non-magnetic material.

BACKGROUND OF INVENTION

Traditionally poles of this kind have been made of wood or steel and are homogenous. Wood poles as well as steel poles have drawbacks of various kind. Other materials such as e.g. concrete reinforced with mineral fibres therefore have been suggested for such poles.

Through e.g. WO 2010/048688 it is known reinforcement bars for concrete based on mineral fibres, where the concrete structure e.g. may be poles for electric wires or telephone wires. The low electric conductivity and the electro-magnetic transparency make them particularly suitable for such applications.

It is further known to make other kinds of poles such as lamp posts of similar material. Thus CN 102192 discloses a lamp post where the material in the post is an outer layer of fibre-reinforced resin, the fibres being glass-, carbon, or basalt fibres and an inner layer of resin/concrete, which may contain glass fibres.

It is also known to generally use high performance concrete armoured with mineral fibres in wall element for building constructions, in particular where the good strength properties of such materials are important such as for very high buildings. WO 2010/098716 discloses how such a material is used for high towers such as towers for mobile antenna systems and towers for wind power plants, i.e. large buildings having a height of several tenths meters and a base of several meters. For different reasons the required equipment is arranged inside these buildings. The buildings in the first place are intended for that.

Poles of the kind to which the present invention relates traditionally have the main function to carry wires and/or antennas at a sufficient height. At the transmission of electric power as well as the transmission of telecommunication signals it is necessary to have equipment for control, regulation etc. Such equipment traditionally is arranged in separate building modules or is simply mounted externally on the poles. This entails drawbacks of various kinds.

SUMMARY OF INVENTION

The object of the present invention is to remedy the drawbacks related to traditional poles of this kind.

This object is according to the first aspect of the invention achieved in that a pole of the initially described kind includes the specific features specified in the characterizing portion of claim 1. The pole thus is hollow at least along a part of its length extension, having a cavity enclosed by a layer of said reinforced concrete, whereby the pole includes electric power transmission components and/or telecommunication components arranged in the cavity. The electric power transmission components include at least one component selected from the group consisting of transformer, energy storage, regulation equipment and inverter/converter. The telecommunication components include at least one component selected from the group of components consisting of ICT-equipment, transmitter, receiver and antenna.

A pole of this material has great advantages in comparison to conventional materials. It has considerably longer lifetime than a pole of wood. It is UV-resistible in contrast to a pole made of a polymer, and in addition much cheaper. In comparison with a pole made of steel or steel-reinforced concrete there is no magnetic or electric interference from the pole. To make the pole partly or completely hollow optimizes the strength in relation to weight and material consumption.

Another great advantage is the low energy required for producing the invented pole. For a pole according to the invention of 10 m length, the energy consumption is 250 kWh. For a traditional steel-reinforced concrete pole of the same length, the energy consumption is 800 kWh. For a composite polymer pole the corresponding figure is 3 800 kWh, and for a steel pole more than 2 000 kWh.

Thanks to the fact that the pole is hollow and the cavity is used to house at least some of the components of the transmission system considerable advantages are attained. Traditionally these components are mounted on the exterior of the pole, where they are exposed to rain and wind. There is also a risk for theft. As an alternative these components can be housed in special buildings in order to avoid these drawbacks. That is costly and renders the system more circumstantial. When the components are arranged within the poles, the problems related to external influences and the risk for theft are avoided and no special buildings are required.

The energy storage may be based on various storage principles such as flywheel or pressurized air.

A further advantage in comparison with traditional ways of arranging these components is that with the invented pole, these components may be distributed more spread than can be done with conventional technique at which the components for economical and practical reasons are concentrated to certain poles at large distances from each other or in still more sparsely located buildings.

With a network with poles according to the invention it will be possible to arrange the components in principle in each pole in a simple and cost effective way, or at least in poles that are relatively neighbouring each other. This results in increased accuracy in control as well as governing since the status information will be more precisely related to the localisation in the network and since the governing and other command signals will be more precisely addressed.

A network with some or all poles according to the invention therefore will be more adapted to the increasing demands at the introduction of smart grids and at 4G/% G-telecommunication. Smart grids are developed for adaption to the fact that electric power consumers to an increased extent select the moment and power level of their consumption and to the fact that the energy generation increasingly occur at a power level that varies with time. The locally spread distribution of the components is a great advantage when meeting the demands required for such grids.

According to a preferred embodiment of the invented pole, the non-magnetic material of the reinforcement includes carbon fibres, glass fibres, basalt fibres and/or silicon fibres.

These kinds of fibres are particularly suitable for the purpose since they in addition to being non-magnetic, are very suitable to use together with concrete and have good strength properties. Particularly good properties in these aspects have basalt fibres. These therefore are preferred. It is to be understood that different kinds of these fibres may be mixed in one and the same reinforcement.

Each reinforcement bar preferably consists of a large number such as up to several thousand fibres embedded in epoxy. Preferably the fibres are pre-stressed in order to increase the bending strength.

According to a further preferred embodiment, the concrete is high performance concrete.

Thereby the strength properties of the pole will be optimized. With high performance concrete is meant concrete having a pressure strength above 80 MPa.

According to a further preferred embodiment, the cavity extends along a major part of the length extension of the pole.

Although only a part of the pole needs to be hollow in order to house the components, it is for strength reasons advantageous if as large part as possible is hollow. Preferably, the entire pole is hollow.

According to a further preferred embodiment, the pole is provided with at least two openings, each connecting the cavity with the surrounding and being localized at different heights, whereby at least one of said components is mounted vertically between these openings.

Some of the components that are to be housed within the pole require cooling. By arranging an opening above and an opening below that or those parts that require cooling, forced air flow will be established between these opening such that cooling may be performed by the surrounding air. In some cases it may be required to maintain a certain minimum temperature for components, whereby the openings and the air circulation may be used for warming up.

According to a further preferred embodiment, one of the openings is arranged adjacent the lower end of the pole and another adjacent the upper end thereof.

Thereby the air circulation will be maximized and also allows cooling a large number of components in the pole.

According to a further preferred embodiment, at least one sensor is mounted in the layer of reinforced concrete and being arranged to sense a mechanical parameter in the concrete.

This offers a possibility to monitor the stresses to which the pole is exposed. It may be of particular interest to detect the bending forces on a pole due to different tension forces in the lines at the different sides of the pole. This may for example occur if one of the lines, but not the other one, becomes heavier due to ice formation thereon. Or it may occur if the temperature is different at the different sides of the pole if one of the lines is exposed to the sunshine and the opposite one is in shadow. Preferably the sensor is a strain gage. Preferably a plurality of such sensors are arranged circumferentially distributed. Groups of such sensors may be arranged at different heights.

According to a further preferred embodiment, one of the sensors is an optic sensor arranged in the cavity, facing the inner surface of the concrete layer and connected to an optical cable within the cavity.

Thereby information of the condition of the concrete layer may be obtained, and measures may be taken if required.

According to a further preferred embodiment, the pole is provided with an emitter and/or a receiver for sending signals representing the status of the components and sensors, and/or receiving signals for governing the components and sensors, respectively.

This makes it possible to supervise a pole and its components as well as governing the components from a locality far away from the pole. This renders the operation more rational. The signalling may be continuous or intermittent.

According to a further preferred embodiment, at least some of the components are attached to a common mounting unit, which is easily detachably attached to the inside of the concrete layer, and the pole is provided with a mounting opening through which the mounting unit with its components can be removed and inserted.

This simplifies service and maintenance of the pole. Preferably all the components may be attached to one and the same mounting unit. The mounting opening may be arranged at the upper end of the pole for taking out the mounting unit in the direction of the length extension of the pole. The opening may preferably be closable.

According to the second aspect of the invention, the object of the invention is achieved by the use of poles according to the invention, in particular according to any of the preferred embodiments thereof, for the transmission of electric power and/or telecommunication signals.

According to the third aspect of the invention the object of the invention is achieved in that a method of the kind described in the introduction includes the specific measures specified in the characterizing portion of claim 13. At least some of the poles thus are provided as hollow poles and at least some of the mentioned components are mounted in a cavity of a pole.

The components may include the components mentioned above for the invented pole. Preferably the components are mounted in a large number of the poles belonging to the network. Preferably the method is performed by using poles according to the present invention, in particular according to any of the preferred embodiments of such a pole.

The invented use and the invented method have advantages of corresponding kinds as those described above for the invented pole and the preferred embodiments thereof.

The above specified preferred embodiments are specified in the dependent claims. Further preferred embodiments may be constituted by any possible combination of features in the above mentioned preferred embodiments and any possible combination of these with features described in the following description of examples.

BRIEF DESCRIPTION OF THE DRAWINGS

FIG. 1 is a side view of a pole according to the invention.
FIG. 2 is an enlarged cross section of a part of the pole taken along the longitudinal axis of the pole.

DESCRIPTION OF EXAMPLES

Figure 3:
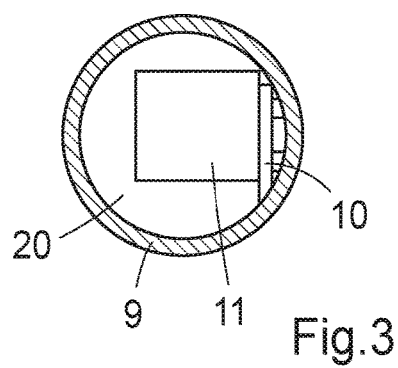
FIG. 3 is a section along line III-III in FIG. 2.

FIG. 1 illustrates a pole 1 according to the invention. In this example it is a combined pole with an electric line 2 and a telephone line 3 connected to the pole at attachments 4 and 5, respectively. The pole 1 is hollow and houses components for the transmission of electric power and telecommunication signals as will be described further below. At the upper end the pole is closed by a lid 6 that can be opened in order to take out the components.

The pole 1 is provided with a first opening 8 at its lower part and a second opening 7 at its upper part. Through these openings air circulation will occur so that the temperature of the components will be regulated.

The pole in the example is cylindrical, but may alternatively be conically narrowing at either end, normally narrowing upwards. The pole 1 typically has a length of 15 m and a diameter of 300 mm. The pole may be moulded in one piece or may be assembled by sections that are joined together.

In FIG. 2, which is a partial enlarged view of the pole in cross section it can be seen how the components 11-17 are mounted in the cavity 20 enclosed by a cylindrical layer 9 of reinforced concrete. The layer has a thickness of 20-50 mm. Further layers may be present inside or outside the concrete layer, e.g. surface coating.

The components 11-17 in the shown example are transformer, energy storage, regulation equipment, inverter/converter, ICT-equipment, antenna and receiver/transmitter. In other cases further components may be present. Also the required cables (not shown) are housed in the cavity. The components 11-17 are mounted on a mounting unit 10 fastened to the inside of the concrete layer 9 in such a way that it can be easily attached and detached, e.g. by snap on devices or hooks.

In this example there is also present an optical cable 19 with an optical sensor 18 for the inspection of the inside of the concrete layer 9.

Figure 4:
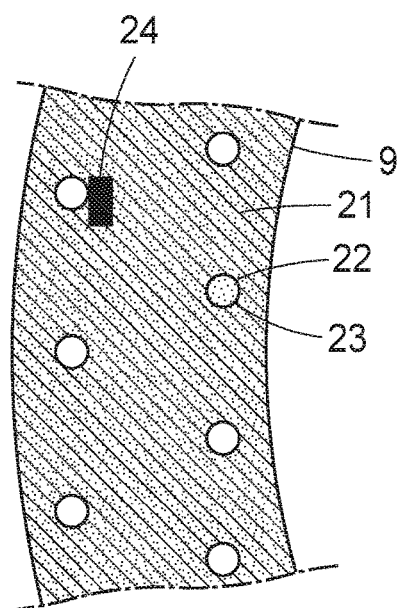
FIG. 4 is a partial enlargement of FIG. 3.

In FIG. 3 the pole 1 is illustrated in a section perpendicular to its longitudinal axis, and FIG. 4 is a partial enlargement of FIG. 3. The concrete layer consists of high performance concrete with longitudinal reinforcement bars 22. The bars consist of basalt fibres embedded in epoxy. The reinforcement bars are pre-stressed and twisted. Each bar contains thousands of fibres.

FIG. 4 also illustrates an example how strain gages 24 are arranged in the concrete layer 9 in order to detect stresses in the pole.

Figure 5:
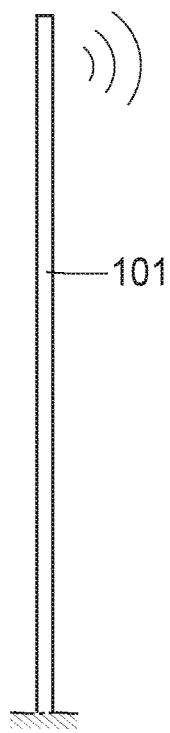
FIG. 5 is a side view of a pole according to a second example of a pole according to the invention.

FIG. 5 illustrates a second example of a pole 101 according to the invention. In this case it is an antenna pole for wireless signal transmission. The pole has substantially the same dimension as that of FIG. 1 and is in the first place intended for 4G/5G-networks which don't require such high masts as in traditional mobile telecommunication systems, but in which the antenna poles are more close to each other.

Figure 6:
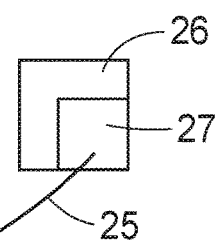
FIG. 6 is an illustration of a network according to the invention.
Figure 6:
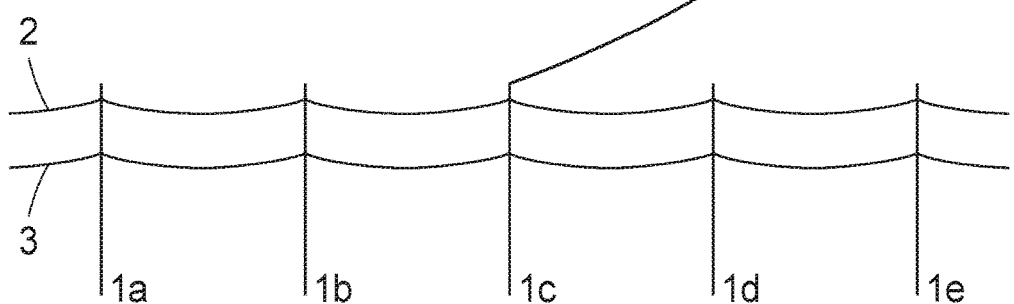

FIG. 6 schematically illustrates a combined electric power an telecommunication network with a power line 2 and a telecom line 3, and where the poles are according to the invention. A building 26 housing a supervision and governing central 27 is connected to the network via connection line 25. Information about the condition in the different part of the network is sent from the components and sensors in the poles 1a-1e. Governing signals are sent from the central 27 to the components in the poles 1a-1e where it is necessary and when needed. In the central 27 information is stored about operation history, and processing equipment is present for processing the information in order to correct and improve the governing and make it more efficient. The connection line 25 of course may be replaced by wireless communication.

The invention claimed is:

1. A pole for the transmission of electric power and/or telecommunication signals, which pole has a length in the range of 2 to 25 meters and a maximum cross section dimension less than 0.5 m, and material of the pole includes reinforced concrete with a reinforcement made of non-magnetic material, wherein the pole is hollow at least along a part of its length extension with a cavity enclosed by a layer of the reinforced concrete, and which pole includes electric power transmission components and/or telecommunication components arranged in the cavity, the electric power transmission components including at least one component selected from the group of components consisting of transformer, energy storage, regulation equipment and inverter/converter, and the telecommunication components consisting of at least one component selected from the group of components consisting of ICT-equipment, transmitter, receiver and antenna; and wherein the pole includes at least one sensor sensing operation conditions or operation parameters; and wherein the at least one sensor is an optical sensor arranged in the cavity facing the inner surface of the concrete layer and being connected to an optical cable in the cavity.

2. An electric power and/or telecommunications utility pole, comprising:

an elongate and reinforced monolithic concrete member; and a plurality of reinforcement bars extending longitudinally in the concrete member, each reinforcement bar comprising prestressed basalt fibers;

wherein the concrete member is hollow along at least part of its length to form a cavity within the pole in which one or more electric power transmission or telecommunications components are mountable, the pole being non-magnetic and transparent to radio waves emitted from within the cavity; and wherein the length of the pole is in the range of 2 to 25 meters and a maximum dimension of a cross-section taken across a longitudinal axis of the pole is less than 0.5 meters; and the pole further comprising an optical sensor in the cavity and facing an inner surface of the concrete member, the optical sensor configured to measure bending forces on the pole due to different tension forces on different sides of the pole.

3. The electric power and/or telecommunications utility pole of claim 2, further comprising at least one electric power transmission component and/or telecommunication component mounted in the cavity, the electric power transmission component being from the group of a transformer, an energy storage device, a regulation device and an inverter/converter, and the telecommunication component being from the group of an ICT-equipment, a transmitter, a receiver and an antenna.

4. The electric power and/or telecommunications utility pole of claim 3, wherein the pole has a first airflow vent opening connecting the cavity with a surrounding environment and a second airflow vent opening connecting the cavity with the surrounding environment, the second airflow vent opening being at a higher elevation than the first airflow vent opening and at a higher elevation than the electric power transmission component and/or telecommunication component.

5. The electric power and/or telecommunications utility pole of claim 2, further comprising an antenna of a radio device mounted in the cavity.

6. The electric power and/or telecommunications utility pole of claim 2, wherein the pole further comprises reinforcement of one or more of carbon fibers, glass fibers or silicon fibers.

7. The electric power and/or telecommunications utility pole of claim 2, wherein the concrete is high performance concrete.

8. The electric power and/or telecommunications utility pole of claim 2, wherein the cavity extends along a majority of the length of the pole.

9. The electric power and/or telecommunications utility pole of claim 2, further comprising a strain gauge encapsulated in the concrete, the strain gauge configured to measure bending forces on the pole due to different tension forces on different sides of the pole.

10. The electric power and/or telecommunications utility pole of claim 9, wherein the stain gauge contacts one of the reinforcement bars.

11. The electric power and/or telecommunications utility pole of claim 2, wherein the pole has:
    a first airflow vent opening connecting the cavity with a surrounding environment;
    a second airflow vent opening connecting the cavity with a surrounding environment, the second airflow vent opening at a higher elevation than the first airflow vent opening; and
    a service opening through which a user accesses the cavity and through which electric power transmission component and/or telecommunication component are insertable into or removable from the pole.

12. The electric power and/or telecommunications utility pole of claim 11, wherein the service opening being an open top end of the pole.

13. The electric power and/or telecommunications utility pole of claim 11, wherein the service opening is at a higher elevation than the second airflow vent opening.

14. The electric power and/or telecommunications utility pole of claim 2, wherein the cavity extends along substantially the entire length of the pole.

15. The electric power and/or telecommunications utility pole of claim 2, wherein the reinforcement bars are twisted.

* * * * *